United States Patent [19]

Maekawa

[11] Patent Number: 4,541,713

[45] Date of Patent: Sep. 17, 1985

[54] DOCUMENT SIZE-DETECTING DEVICE OF COPYING MACHINE

[75] Inventor: Yoshikazu Maekawa, Hachioji, Japan

[73] Assignee: Konishiroku Photo Industry Co., Ltd., Tokyo, Japan

[21] Appl. No.: 570,361

[22] Filed: Jan. 13, 1984

[30] Foreign Application Priority Data

Jan. 19, 1983 [JP] Japan .................................. 58-7925
Jan. 19, 1983 [JP] Japan .................................. 58-7926

[51] Int. Cl.[4] ......................... G03B 27/62; H01J 40/14
[52] U.S. Cl. ........................................ 355/75; 250/578
[58] Field of Search ........................ 355/41, 61, 75, 55, 355/59; 356/400; 250/578

[56] References Cited

U.S. PATENT DOCUMENTS 4,338,020 7/1982 Yukawa et al. ....................... 355/41
4,511,246 4/1985 Nishiyama ........................... 355/75

*Primary Examiner*—Richard A. Wintercorn
*Attorney, Agent, or Firm*—Jordan B. Bierman

[57] ABSTRACT

A copying machine having an optical scanner adapted to transfer an optical image onto a photoreceptor during movement between the scanner and the object to be copied. A platen cover with a document-holding surface bears against the document being copied and is provided with a plurality of colored portions corresponding to various sizes of documents in the scanning direction. There is a light projector which irradiates the surface of the platen, including the colored portions, and a light-receiving means adapted to distinguish the colored portions from the rest of the surface. The light receiving means generates an output signal which corresponds to the colored portions and there is a means for determining, from the output, whether the signal is in the range corresponding to the wavelength of the colored portions.

4 Claims, 6 Drawing Figures

DOCUMENT SIZE-DETECTING DEVICE OF COPYING MACHINE

BACKGROUND OF THE INVENTION

1. Field of the Invention

The present invention relates to an improvement in a document size-detecting device detecting the size of the document placed on a platen for a copying machine such as an electrophotographic copying machine and others.

2. Description of the Prior Art

Heretofore, Japanese Patent Publication Open to Public Inspection No: 11242/1975 has shown a copying machine wherein copy papers in different sizes or papers in roll type are loaded and a sheet of paper with a suitable size for the size of a document placed on a platen of the copying machine is selected or cut and then conveyed. In the document size-detecting device of such copying machine, the light projecting devices and the photoelectric converting devices are provided in parallel along the diagonal direction of the document on both the document-holding cover (platen cover) and the under surface of the platen so that the light projecting device and the photoelectric converting device oppose each other and the detection of the document size is made based on the information of the sizes of output of the photoelectric converting devices in parallel. On such a document size-detecting device, owing to the dispersion of the sensitivity of photoelectric converting devices in parallel, the dispersion and variation of the emission intensity of the light projecting device and further to the external light that enters leaking through the clearance of the platen cover, it is feared that the information on the size of output of the photoelectric converting device does not necessarily reflect the size of the document and thereby it causes an erroneous selection of the paper. Further, either one of light projecting device and photoelectric converting device is provided on the platen cover that is opened and closed, therefore a failure tends to take place thereon and the shade of the light projecting device or of the photoelectric converting device appears on the copy paper, which is disadvantageous.

The present applicant has made a proposal in Japanese Patent Publication Open to Public Inspection No. 22424/1981 (U.S. application Ser. No. is 172,821/1980) with an object to provide the document size-detecting device that solves aforesaid problems. The proposal includes a document size-detecting device for the copying machine comprising a colored portion that is colored to a certain color, the light projecting device irradiating the colored portion and the light-receiving member that receives the light irradiated from the light projecting device and is reflected on the colored portion, and is characterized in that a part of or all of the light irradiated from aforesaid light projecting device to aforesaid light-receiving member are intercepted by the document placed on the platen and thereby the size of the document is detected.

Namely, in the document size-detecting device of aforesaid proposal, the characteristics of the light-receiving member where plurality of the detecting elements capable of obtaining signals proportional to the wavelength of incident light are arranged, are utilized thereby the reflected light or the transmitted light from the colored portion which is not covered by the document is detected and the detection of document size is made according to the information relating to the existence of aforesaid detection made by detecting elements in parallel relating to document size.

Aforesaid proposal has advantages that there is no dispersion of sensitivity which has been experienced in the light-receiving member of the conventional photoelectric converting device and that it is hardly influenced by the dispersion variation of radiation intensity of the light projecting device and by the external light whose intensity ratio for the specific wavelength relating to the colored portion is low and thereby there is not a fear of erroneous operation. On the other hand, however, the document size-detecting device of aforesaid proposal has detecting elements for each document size to be detected and detection of document size is made by the combination of outputs of the detecting elements. Therefore it is necessary to use a lot of detecting elements and function thereof is complicated, then inexpensive document size-detecting device has not been available. Further, when the color of the document is similar to or close to the color of colored portion, the detecting capability may fall, which has been a disadvantage.

OBJECTS AND SUMMARY OF THE INVENTION

An object of the present invention is to improve remarkably the reliability by simplifying the circuit structure with only one detecting element and by enabling it to detect even in the case that the color of the document is similar to or close to the color of the colored portion and further to provide an inexpensive document size-detecting device.

The present invention is intended to attain aforesaid object and to provide a document size-detecting device for copying machine wherein plural colored portions which are colored to a certain color are provided on the document-holding surface of the document-holding member with intervals corresponding to the document sizes and the light projector to irradiate against aforesaid document-holding surface for each document as well as the light-receiving member to receive the reflected light from aforesaid document-holding surface are provided and aforesaid document size is detected through the output time of the reflected light from the colored portion on aforesaid document-holding surface which is not covered by aforesaid document.

Namely, in the present invention, the document is held, while copying, by the platen cover whose document-holding surface is furnished with plural colored portions with intervals corresponding to the document sizes, the light projector to irradiate against the document surface and the detecting element to receive the reflected light from the document or the document-holding surface which is irradiated by the light projector are provided and the time information generated from aforesaid colored portion detected by the detecting element is compared with the information stored previously in the controlling section on the main body thus the detection of document size is made with a coincidence of both information which is judged to be colored portion on the surface of document-holding member.

DESCRIPTION OF THE PREFERRED EMBODIMENTS

Figure 1:
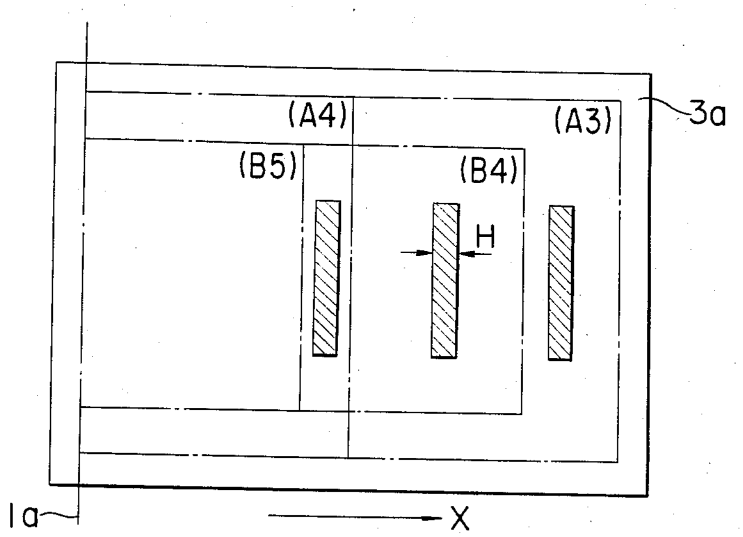
FIG. 1 shows an example indicating the state of colored portions provided on the document-holding surface of the document-holding member.
Figure 2:
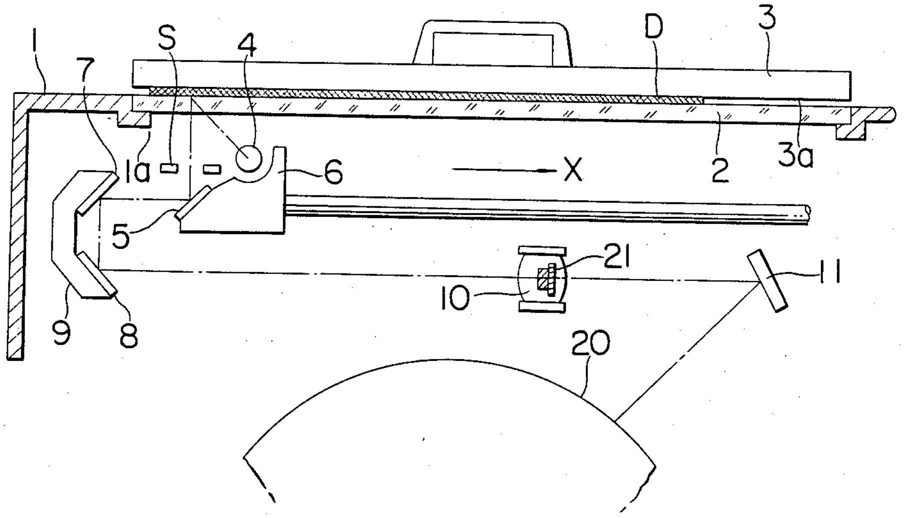
FIG. 2 is a schematic diagram showing an example of a principal part of the copying machine having the document-holding surface shown in FIG. 1.

FIG. 1 is an example showing the state of the colored portions provided on the document-holding surface of the document-holding member (platen cover) in which plural colored portions with a fixed width are provided in the direction of scanning for document reading (direction of arrow X in FIG. 1) with intervals corresponding to document sizes and placing positions of documents in various sizes are shown with dashed lines. FIG. 2 is a schematic diagram showing an example of a principal part of the copying machine having the document-holding surface shown in FIG. 1. Incidentally, 1*a* in both FIG. 1 and FIG. 2 represents the starting point for document reading scanning.

On the main body 1 of the copying machine, there are arranged the platen 2 made of transparent glass on which the document D is placed and the platen cover 3 that covers the document D after the document D is placed on the platen 2. On the document-holding surface 3*a* of the platen cover 3 that touches the document D, the colored portions shown in FIG. 1 are arranged at the fixed locations.

Under the platen 2 and inside the main body of copying machine, there is provided a first mirror unit 6 having thereon an exposure lamp 4 and the first mirror 5 so that it can travel rectilinearly in the direction from left to right or from right to left in the drawing in parallel with aforesaid platen 2, thus it scans optically the entire face of the document D. The numerals 7 and 8 are the second mirror and the third mirror respectively and the second mirror unit 9 in which the second mirror and the third mirror are unified travels rectilinearly in the direction from left to right or from right to left at the speed that is half the speed of the first mirror unit so that the necessary optical path length can be kept. Of course, the movement of the second mirror unit 9 is parallel to the platen 2 similarly to aforesaid first mirror unit. The light reflected on the document D on the platen 2 is further reflected on the aforesaid first mirror 5, the second mirror 7 and on the third mirror 8 and then is led through the primary lens 10 and fourth mirror 11 onto the photoreceptor drum 20 as an image carrier through the slit S provided near the document surface.

On the copying machine having such optical system, the exposure lamp 4 is used as a light projector in the present example and there is provided on the close side of the primary lens 10 the color sensor 21 (e.g., semiconductor color sensor PD-150 . PD-150, commercialized by Sharp Co., Ltd. in Japan) to which the reflected light from the colored portion (e.g., yellow is desirable because it is not sensitive to the photoreceptor like Se (Selenium, Selenium alloy) and others but it can be detected by the color sensor) on aforesaid document-holding surface 3*a* is projected.

Figure 3:
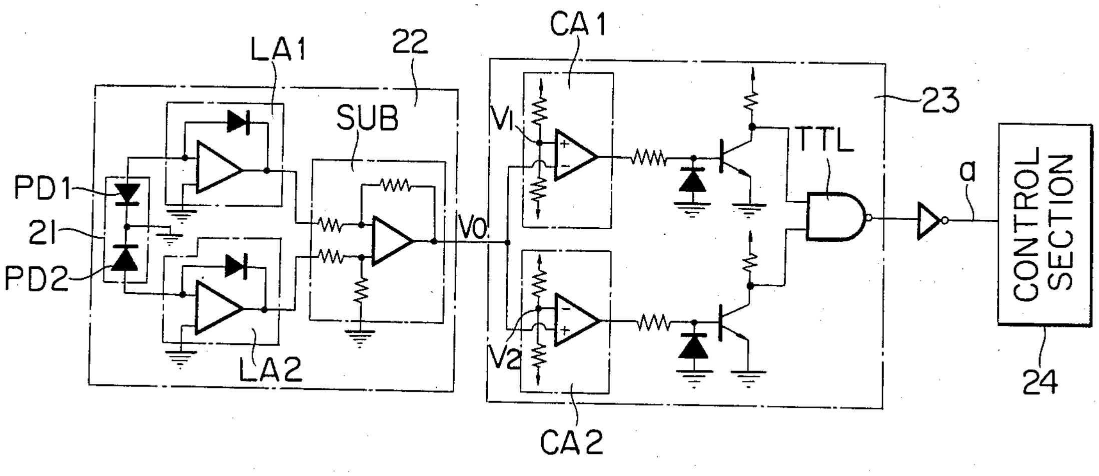
FIG. 3 and FIG. 5 show examples of the diagram of document size-detecting circuit having the colored portion-detecting circuit to be used for the present invention.

Referring to FIG. 3, the circuit from the output of the color sensor 21 as a detecting element that detects the colored portion will be explained as follows.

In FIG. 3, 22 is a color sensor unit arranged at the location corresponding to the document size to be detected, 23 is a binary level discriminant circuit and 24 is a control section.

The outputs of two photodiodes PD 1 and PD 2 contained in the color sensor 21 whose spectral-response characteristics are different each other are logarithmically compressed by the color sensor unit 22 through the logarithmic amplifying circuits LA 1 and LA 2 respectively and when the compressed one is inputted in the subtracting circuit SUB, the voltage $V_0$ whose degree is independent of the intensity of the incident light and is proportional to the detection wavelength. Namely, $V_0$ is in a relation of $V_0 \propto (\log I_{sc2} - \log I_{cs1}) = \log(I_{sc2}/I_{sc1})$ [where, $I_{sc1}$ and $I_{sc2}$ are output current of photodiodes PD 1 and PD 2 respectively].

The binary level discriminant circuit 23 receives from the color sensor unit 22 the voltage $V_0$ whose degree is proportional to the detection wavelength and detects whether the voltage $V_0$ is caused by the light having the specific wavelength corresponding to the color of aforesaid colored portion pouring into the color sensor. Namely, in the binary level discriminant circuit 23, the output voltage $V_0$ of the color sensor unit 22 is first fed into (−) input terminal of the comparison amplifier CA 1 and into (+) input terminal of the comparison amplifier CA 2 and then on CA 1, the comparison is made with a reference voltage $V_1$ which is inputted in (+) input terminal and is slightly lower than the voltage corresponding to aforesaid specific wavelength relating to fixed color and on CA 2, the comparison is made with a reference voltage $V_2$ which is fed in (−) input terminal and is slightly higher than the voltage corresponding to the specific wavelength and CA 1 generates high level signals under the condition of $V_0 < V_1$ and generates low level signals under the condition of $V_0 > V_1$ and then CA 2 generates low level signals under the condition of $V_0 < V_2$ (where, $V_1 < V_2$) and generates high level signals under the condition of $V_0 > V_2$. The output signals of the comparison amplifier CA 1 and CA 2 as mentioned above are processed in the transistor circuit and then are fed into the transistor. transistor logical circuit TTL and TTL generates low level signals when $V_0$ is in a condition of $V_1 < V_0 < V_2$ and it generates high level signals when $V_0$ is in a condition of $V_0 < V_1$ or $V_0 > V_2$ and therefore the binary level discriminant circuit 23 detects the existence of the incidence of the light having the specific wavelength against the color sensor 21.

The relation between the input and the output on the aforesaid binary level discriminant circuit is shown in Table 1.

TABLE 1

| input voltage ($V_0$) | CA 1 output | CA 2 output | TTL input 2 | TTL input 2 | TTL output |
|---|---|---|---|---|---|
| $V_0 < V_1$ | H | L | L | H | H |
| $V_1 < V_0 < V_2$ | L | L | H | H | L |

TABLE 1-continued

| input voltage ($V_0$) | CA 1 output | CA 2 output | TTL input 2 | TTL input 2 | TTL output |
|---|---|---|---|---|---|
| $V_0 > V_2$ | L | H | H | L | H |

(note)
H represents high level signals and
L represents low level signals.

Since the inverter is interposed between the output side of TTL and the input side of the control section 24, the signal from the colored portion is fed into the control section 24 as a high level (convex upward) pulse signal. On the control section 24, as mentioned above, the detection of document size is made by the comparison between the information stored previously and the number of lines (number of pulses) on the colored portion.

Figure 4:
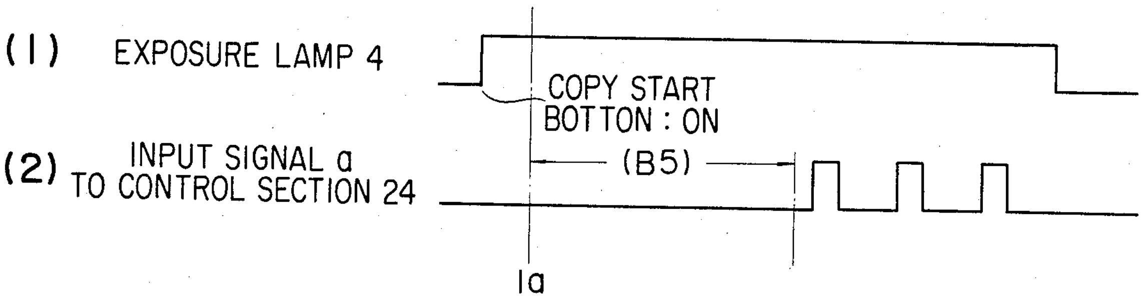
FIG. 4 and FIG. 6 show the time chart to be used for the explanation of the mechanism of the document size detection in respect to FIG. 3 and FIG. 5 of the present invention.

FIG. 4 is a time chart showing the relation between the lighting of the exposure lamp 4 and the input signal obtained through the color sensor 21 into the control section corresponding to the colored portion, and it shows the state in which the document with B5 size is copied.

For example, when the document D with B5 size is placed on the platen 2 and if the copy button is pressed, the exposure lamp 4 which doubles as a light-projecting lamp is lit and optical scanning is made. The exposure lamp 4 illuminates the platen 2 and the light reflected therefrom passes through the slit S and then is reflected on the first mirror 5, second mirror 7 and third mirror 8 and then is led to the color sensor 21. The exposure lamp 4 which doubles as a light-projecting lamp is moved in the direction X first and thereby irradiates the document D with B5 size and then irradiates the document-holding surface 3*a* of the platen cover 3 which is not covered by the document. While the document-holding surface 3*a* is being irradiated, three lines signal on the colored portion is obtained on the color sensor 21 when the document size is B5.

Since the colored portion is of the striped pattern in the direction of scanning for document reading as shown in FIG. 1, signals of pulse waveform convex upward corresponding to three lines of colored portions are obtained when the document size is B5 (as shown in FIG. 4 - 2). Likewise, the signals of colored portions in two lines for A4 size, one line for B4 size and 0 lines for A3 size are obtained respectively.

On the circuit shown in FIG. 3 or the like, therefore, the relation between the number of lines of colored portions and the document size mentioned above is previousely stored in the control section of the copying machine. And in the control section 24, the pulses corresponding to aforesaid colored portions which are convex upward are counted and the value thus counted is compared with a value stored as mentioned above and corresponding to the document size, thus the signal showing the corresponding document size is generated.

When the size-change such as an enlargement or a reduction is made, the relation between the document size to be changed and the size of the papers to be supplied can be stored for supplying the paper of pertinent size.

In the present example, incidentally, an explanation has been made, referring to the example shown in FIG. 2, on a copying machine wherein the platen is stationary while the optical system for copying travels for document scanning but the present invention is not limited to this and the present invention may be applied to a copying machine wherein the optical system for copying is stationary and the platen travels for document scanning if the document can be scanned on the copying machine. The present invention may also be naturally applied to a copying machine wherein a solid image pickup element such as CCD and others is employed. Even when the platen travels, the detection of the document size is made by the color sensor arranged near the exposure lamp.

Though the exposure lamp is used also as a light-projecting device in the present example, such combined use is naturally unnecessary and they may be provided separately.

In the present example explained above, various sizes of documents can be detected by only one detecting element used and it has proved to provide an excellent document size-detecting device of a copying machine wherein the circuit structure is simple and the reliability for detection of the document size has been improved.

Figure 5:
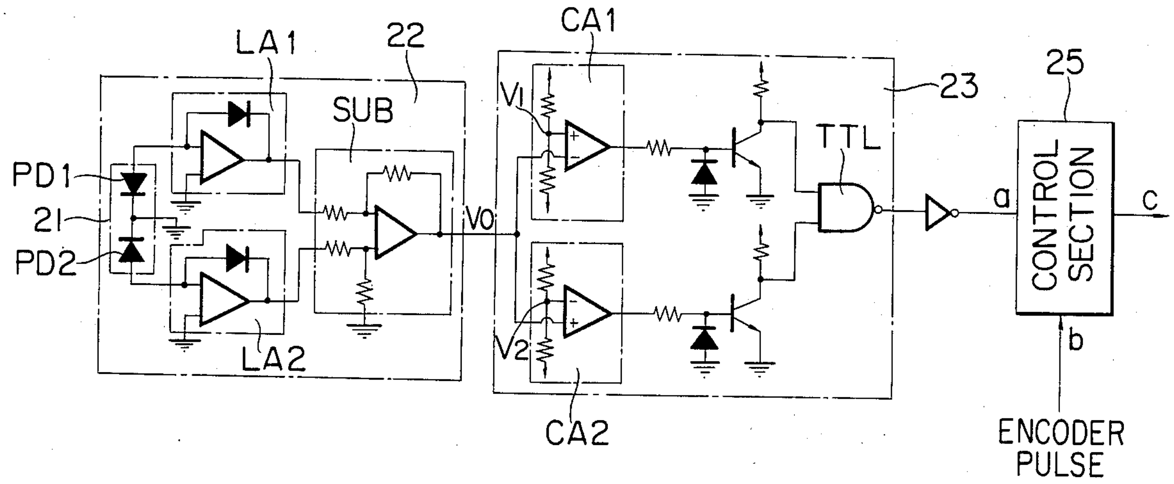

FIG. 5 is a circuit diagram to be connected to the control section 25 and is an example of the circuit that detects the reflected light from the colored portion and detects the document size based on the detection of the reflected light.

In FIG. 5, 22 represents the color sensor unit arranged at the location corresponding to the document size to be detected, 23 is a binary level discrimination circuit and 25 is a control section.

The outputs of two photodiodes PD 1 and PD 2 contained in the color sensor 21 whose spectral-response characteristics are different each other are logarithmically compressed by the color sensor 22 through the logarithmic amplifying circuits LA 1 and LA 2 respectively and when the compressed one is inputted in the subtracting circuit SUB, the voltage $V_0$ whose degree is independent of the intensity of the incident light and is proportional to the detection wavelength. Namely, $V_0$ is in a relation of $V_0 \propto (\log I_{sc2} - \log I_{sc1}) = \log(I_{sc2}/I_{sc1})$ [where, $I_{sc1}$ and $I_{sc2}$ are output current of photodiodes PD 1 and PD 2 respectively].

The binary level discriminant circuit 23 receives from the color sensor unit 22 the voltage $V_0$ whose degree is proportional to the detection wavelength and detects whether the voltage $V_0$ is caused by the light having the specific wavelength corresponding to the color of aforesaid colored portion pouring into the color sensor. Namely, in the binary level discriminant circuit 23, the output voltage $V_0$ of the color sensor unit 22 is first fed into (−) input terminal of the comparison amplifier CA 1 and into (+) input terminal of the comparison amplifier CA 2 and then on CA 1, the comparison is made with a reference voltage $V_1$ which is inputted in (+) input terminal and is slightly lower than the voltage corresponding to aforesaid specific wavelength and on CA 2, the comparison is made with a reference voltage $V_2$ which is fed in (−) input terminal and is slightly higher than the voltage corresponding to the specific wavelength and CA 1 generates high level signals under the condition of $V_0 < V_1$ and generates low level signals under the condition of $V_0 > V_1$ and then CA 2 generates low level signals under the condition of $V_0 < V_2$ and generates high level signals under the condition of $V_0 > V_2$. The output signals of the comparison amplifier CA 1 and CA 2 as mentioned above are processed in the transistor circuit and then are fed into the transistor. Transistor logical circuit TTL and TTL generates low level signals when $V_0$ is in a condition of $V_1 < V_0 < V_2$ and it generates high level signals when $V_0$ is in a condition of $V_0 < V_1$ or $V_0 > V_2$ and therefore discriminant ciroult 23 detects the existence of the incidence of the light having the specific wavelength against the color sensor 21.

The relation between the input and the output on the aforesaid binary level discriminant circuit is shown in Table 1.

Since the inverter is interposed between the output side of TTL and the input side of the control section 25, the signal from the colored portion is fed into the control section 25 as a high level pulse signal.

Since the colored portion is of the striped pattern in the direction of scanning for document reading as shown in FIG. 1, signals of three lines of colored portions are obtained when the document size is B5. Likewise, the signals of colored portions in two lines for A4 size, one line for B4 size and 0 lines for A3 size are obtained respectively.

Figure 6:
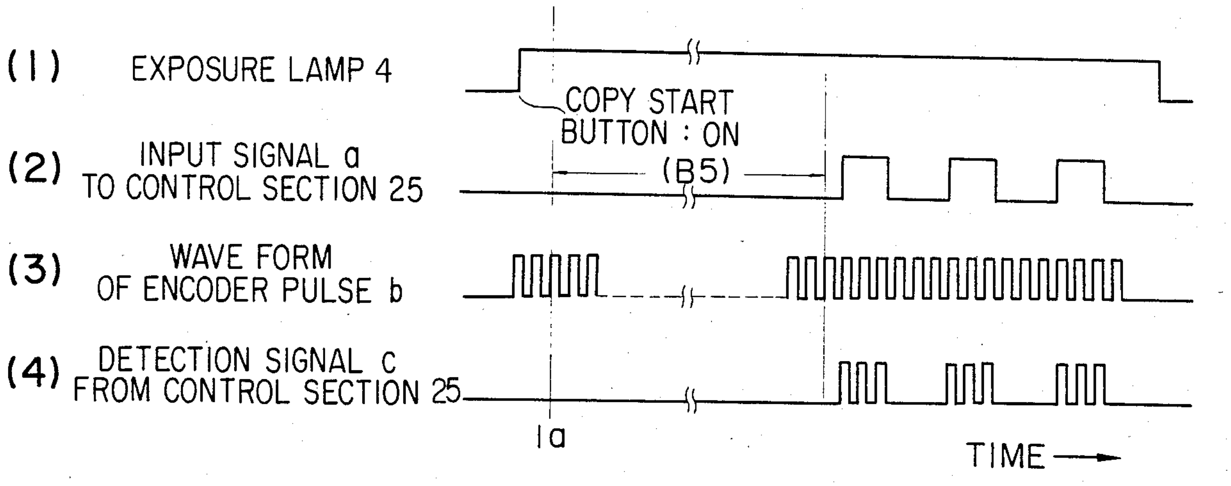

FIG. 6 is a time chart showing the relation between the lighting of the exposure lamp 4 and input signals as well as encoder pulses obtained through the color sensor 21 into the control section and it shows the state in which the document with B5 size is copied.

The output a from TTL through the invertor and encoder pulses with a constant frequency or clock pulses b are fed into the control section 25. When the detecting system of the present invention detects the level of the colored portion, namely, when the output a is H, the control section 25 of the main body detects the encoder pulses of the main body. When the output a becomes L, the detection of the encoder pulses is discontinued. This signal corresponds to output c signal. Since the width H of the colored portion and the scanning speed of the exposure lamp 4 are known previously, the colored portion is surely proven by the number of encoder pulses fed and corresponds to the width of the colored portion.

For example, when the width H of the colored portion is 15 mm, the scanning speed of the exposure lamp 4 is 170 mm/s, one pulse period of encoder pulse is 10 msec and the slit S of the optical system is 8 mm, the distance during which the reflected light from the colored portion passes through the entire width of the slit corresponds to the 7 mm in accordance with scanning direction of the exposure lamp, and the distance during which the reflected light from the colored portion passes through the half or more of the width of the slit corresponds to 15 mm in accordance with direction and for both cases, the time required for them is about 40 msec and 90 msec respectively which relate to 4 pulses and 9 pulses respectively. These are set up to 3–10 pulses considering the margin. Therefore, if the output a is H during the period between the minimum of 3 pulses and the maximum of 10 pulses, this can be judged as a colored portion. In the case of 3 pulses or less than that, it will be judged as a noise and in the case of 10 pulses or more than that, it will be judged as a document whose color is akin to that of colored portion. So, when the light corresponding to the reflected light from the colored portion continues for the period of 10 pulses or more of encoder pulse, the method for detecting the document size may be the one wherein the pulses generated continuously are counted and the continuing time for the number of pulses thus counted detects the size in the scanning direction.

Since the relation between the number of lines of colored portion and the document size is previously stored in the control section (not illustrated) of the main body of copying machine like the case, for example, that three lines of the colored portion represent B5 size, when the c signal output from the control section 25 in FIG. 5 is generated in a way shown in FIG. 6, the detection of the document size is made by the judgment of the number of pulses corresponding to the time frame for the number of lines of colored portion.

Further, when the size-change such as an enlargement or a reduction is made, the relation between the document size to be changed and the size of the paper to be supplied stored in the control section 25 enables the pertinent size paper to be supplied.

In the present example, the number of lines of the colored portion or the time frame corresponding to the number of lines is detected and thereby the document size is detected, but the present invention is not limited to this. It is possible, utilizing the encoder pulse, to count the total pulse number generated for the period from copy start ON up to the point when the detection of the colored portion is first started and to compare the total pulse number with the pulse number which is stored previously for the detection of the document size, which is included in the present invention.

In the present example, the explanation was made, referring to the example shown in FIG. 2, on the copying machine wherein the platen is stationary and the optical system for copying travels for the scanning of document but the present invention is not limited to this. The present invention may further be applied to the copying machine wherein the optical system for copying is stationary and the platen travels for the scanning of document. It may further be applied naturally to the copying machine wherein a solid image pickup element such as CCD or the like is employed. Even in the case of a movable platen, the detection of document size is made with a color sensor provided near the exposure lamp.

Though the exposure lamp is used also as a light-projecting device in the present example, such combined use is naturally unnecessary and they may be provided separately.

In the present example explained above, various sizes of documents can be detected by only one detecting element used and the circuit structure proved to be simple. Further, the level of colored portion as well as the width thereof can be detected and documents of all colors can be detected while in the past, the document with a color that is akin to that of the colored portion was not able to be detected. Thus, there has been provided an excellent document size-detecting device of a copying machine wherein the reliability for detection of the document size has been improved.

Further, as the third embodiment, it is possible to provide many colored portions on the document-holding surface of the platen cover 3 with a constant interval in the direction of scanning and to count the number of colored lines which are not covered by the document when detecting the document size and to compare the counted number with the correspondence between the document size and counted number which is stored in the control section previously, in order to detect the document size.

What is claimed is:

1. A copying machine comprising an optical scanner adapted to transfer an optical image of a document to be copied onto a photoreceptor during relative movement between said scanner and said document, a platen cover having a document-holding surface on one side thereof, said surface being adjacent said document on the side away from said scanner, said surface being provided with a plurality of colored portions corresponding to sizes of said documents in the scanning direction, a light projector irradiating said surface and said surface and said portions, light receiving means adapted to distinguish said portions from the rest of said surface, and generating an output signal corresponding to of each said portions, means for determining from said output signal whether said signal is in the range corresponding to the wavelength of said colored portions.

2. The machine according to claim 1 wherein the the document size is detected by counting the number of said signals in the form of pulses.

3. The machine according to claim 1 wherein the document size is detected based on the length of the period during which said output signals are generated.

4. The machine according to claim 3 wherein said signals are counted only when said length corresponds to the predetermined fixed width of said colored portions.

* * * * *